(12) United States Patent
Iwata et al.

(10) Patent No.: US 11,448,317 B2
(45) Date of Patent: Sep. 20, 2022

(54) SIDE RAIL

(71) Applicant: KABUSHIKI KAISHA RIKEN, Tokyo (JP)

(72) Inventors: Yasuhiro Iwata, Tokyo (JP); Hiroshi Shimizu, Tokyo (JP); Yuichiro Takezawa, Tokyo (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 16/652,071

(22) PCT Filed: Sep. 25, 2018

(86) PCT No.: PCT/JP2018/035483
§ 371 (c)(1),
(2) Date: Mar. 30, 2020

(87) PCT Pub. No.: WO2019/069748
PCT Pub. Date: Apr. 11, 2019

(65) Prior Publication Data
US 2020/0248808 A1   Aug. 6, 2020

(30) Foreign Application Priority Data

Oct. 5, 2017   (JP) .............................. JP2017-195287

(51) Int. Cl.
*F16J 9/20*   (2006.01)
(52) U.S. Cl.
CPC ...................... *F16J 9/20* (2013.01)
(58) Field of Classification Search
CPC ...... F16J 9/20; F16J 9/068; F16J 9/064; F16J 9/203; F02F 5/00
See application file for complete search history.

(56) References Cited

U.S. PATENT DOCUMENTS 2,905,512 A * 9/1959 Anderson ................. C23C 4/01
                                                    277/442
4,497,497 A * 2/1985 Berti ....................... F16J 9/062
                                                    267/1.5
(Continued)

FOREIGN PATENT DOCUMENTS

CN      203962189 U    11/2014
JP      S5763951 U      4/1982
(Continued)

OTHER PUBLICATIONS

Nov. 27, 2018, International Search Report issued in the International Patent Application No. PCT/JP2018/035483.
(Continued)

*Primary Examiner* — Grant Moubry
(74) *Attorney, Agent, or Firm* — Kenja IP Law PC

(57) ABSTRACT

Provided is a side rail 1 having an outer peripheral surface 14, an inner peripheral surface 13, a first axial side surface 11, and a second axial side surface 12 parallel to the first axial side surface 11, in which, a beveled portion 30 is provided between the outer peripheral surface 14 and the second axial side surface 12, the beveled portion 30 is formed in a tapered surface having a diameter gradually decreasing from the first axial side surface 11 toward the second axial side surface in an axial direction; a tapered surface 30*a* is provided between a first tapered surface portion 30*a*1 with an angle of 10° or more to the axial direction and a second tapered surface portion 30*a*2 provided between the first tapered surface portion 30*a*1 and the outer peripheral surface 14 and having a smaller angle of inclination to the axial direction than that of the first tapered surface portion.

8 Claims, 5 Drawing Sheets

(56) References Cited

U.S. PATENT DOCUMENTS

| | | | | | |
|---|---|---|---|---|---|
| 5,295,696 | A | * | 3/1994 | Harayama | F16J 9/062 277/443 |
| 7,077,402 | B2 | * | 7/2006 | Katumaru | F16J 9/061 277/434 |
| 7,207,571 | B2 | * | 4/2007 | Yoshida | F16J 9/206 277/434 |
| 7,354,045 | B2 | * | 4/2008 | Abe | F16J 9/062 277/435 |
| 8,640,314 | B2 | * | 2/2014 | Armstrong | B23P 19/043 29/222 |
| 8,820,750 | B2 | * | 9/2014 | Chiba | B23P 15/06 277/443 |
| 9,067,286 | B2 | * | 6/2015 | Lopez | F16J 9/26 |
| 9,784,369 | B2 | * | 10/2017 | Fujita | F16J 9/26 |
| 10,253,882 | B2 | * | 4/2019 | Sytsma | F16J 9/066 |
| 10,428,943 | B2 | * | 10/2019 | Takezawa | F16J 9/06 |
| 10,508,738 | B2 | * | 12/2019 | Shimizu | F16J 9/203 |
| 10,571,024 | B2 | * | 2/2020 | Kawano | F16J 9/20 |
| 2006/0006604 | A1 | * | 1/2006 | Abe | F16J 9/20 277/434 |
| 2012/0205876 | A1 | * | 8/2012 | Fujimura | F16J 9/26 277/442 |
| 2013/0049305 | A1 | * | 2/2013 | Miyamoto | F16J 9/26 277/467 |
| 2015/0198249 | A1 | * | 7/2015 | Watanabe | F16J 9/20 277/434 |
| 2015/0225836 | A1 | * | 8/2015 | Sugiura | F16J 9/20 427/528 |
| 2016/0040622 | A1 | * | 2/2016 | Donahue | F16J 9/064 123/193.4 |
| 2016/0040780 | A1 | * | 2/2016 | Donahue | F02F 3/28 123/193.4 |

FOREIGN PATENT DOCUMENTS

| | | |
|---|---|---|
| JP | H051062 U | 1/1993 |
| JP | 2003049705 A | 2/2003 |
| JP | 2003194222 A | 7/2003 |
| JP | 5833276 B1 | 12/2015 |
| JP | 2016035326 A | 3/2016 |
| JP | 2016156411 A | 9/2016 |
| JP | 2016169791 A | 9/2016 |
| JP | 2017187125 A | 10/2017 |

OTHER PUBLICATIONS

Sep. 30, 2020, the Extended European Search Report issued by the European Patent Office in the corresponding European Patent Application No. 18865205.1.

Apr. 8, 2020, International Preliminary Report on Patentability issued in the International Patent Application No. PCT/JP2018/035483.

Nov. 23, 2020, Office Action issued by the Intellectual Property India in the corresponding Indian Patent Application No. 202017014885.

Jul. 5, 2021, Communication pursuant to Article 94(3) EPC issued by the European Patent Office in the corresponding European Patent Application No. 18865205.1.

May 11, 2021, Office Action issued by the China National Intellectual Property Administration in the corresponding Chinese Patent Application No. 201880063554.2.

Jul. 26, 2021, Office Action issued by the Korean Intellectual Property Office in the corresponding Korean Patent Application No. 10-2020-7009765.

Jan. 3, 2022, Communication pursuant to Article 94(3) EPC issued by the European Patent Office in the corresponding European Patent Application No. 18865205.1.

Nov. 22, 2021, Office Action issued by the China National Intellectual Property Administration in the corresponding Chinese Patent Application No. 201880063554.2.

Jan. 18, 2022, Office Action issued by the Korean Intellectual Property Office in the corresponding Korean Patent Application No. 10-2020-7009765.

Mar. 15, 2022, Office Action issued by the Korean Intellectual Property Office in the corresponding Korean Patent Application No. 10-2020-7009765.

May 24, 2022, Office Action issued by the Korean Intellectual Property Office in the corresponding Korean Patent Application No. 10-2022-7012712.

Mar. 23, 2022, Office Action issued by the China National Intellectual Property Administration in the corresponding Chinese Patent Application No. 201880063554.2.

* cited by examiner

SIDE RAIL

TECHNICAL FIELD

This disclosure relates to a side rail that is combined with an annular space expander and constitutes, together with the space expander, a multi-piece oil ring used in an internal combustion engine.

BACKGROUND

In addition to a compression ring configured to seal combustion gas, an oil ring configured to control oil on a cylinder inner surface is installed in a piston of a reciprocating engine (a reciprocated internal combustion engine). As such an oil ring, a multi-piece oil ring formed by combining one side rail or a pair of side rails with an annular space expander has been popularly used.

The side rail used for a multi-piece oil ring is formed in a split ring shape with an opening. When the side rail is pressed by the space expander such that the diameter of the side rail extends, the outer peripheral surface thereof comes in contact with the cylinder inner surface with a predetermined contact pressure (a surface pressure). When the engine operates and the piston reciprocates, the outer peripheral surface of the side rail slides on the cylinder inner surface, forming an oil film with an appropriate thickness on the cylinder inner surface and scraping off excess oil adhered to the cylinder inner surface toward a crankcase to prevent the oil from climbing up.

In recent years, following an improvement in functionality of the internal combustion engine to meet a market demand for low fuel consumption and low oil consumption, there has been a demand for a multi-piece oil ring capable of controlling an oil scraping-up action during piston upstroke (compression stroke and exhaust stroke) and amplifying an oil scraping-off action during piston downstroke (intake stroke and combustion stroke) and thus reducing friction against the cylinder inner surface as well as the oil consumption. In an effort to meet such a demand, there are proposed side rails having outer peripheral surfaces facing radially outward and formed in various shapes.

For example, Patent Literature (PTL) 1 describes a side rail having an outer peripheral surface facing radially outward formed in a curved surface having a vertex at its axial center and protruding radially outward.

Further, in general, it has been known that a smaller width of the outer peripheral surface to be hit against the cylinder inner surface allows a friction of the side rail against the cylinder inner surface to be reduced. Thus, in order to reduce the hitting width, the outer peripheral surface of the side rail has been formed in a vertically (in front and back sides) asymmetrical shape with slight changes in shape.

For example, PTL 2 describes a side rail that includes an outer peripheral surface having an asymmetrical area including an outer peripheral vertex and being asymmetrical with respect to the axial direction and a pair of symmetrical areas that are provided on both sides across the asymmetrical area and being symmetrical to each other with respect to the axial direction.

CITATION LIST

Patent Literature

PLT 1: JP2003-194222 (A)
PLT 2: JP5833276 (B1)

SUMMARY

Technical Problem

However, the outer peripheral surface formed in a vertically asymmetrical shape with slight shape changes as described above causes distinction between top and bottom (front and back) directions of the side rail to be difficult. Therefore, there is a problem that the side rail is assembled in a wrong direction during production of side rails or mounting of a piston into a ring groove.

Therefore, it could be helpful to provide a side rail that facilitates distinction between top and bottom directions thereof.

Solution to Problem

A disclosed side rail is formed in a split ring shape with an opening. The side rail is combined with an annular space expander and constitutes, together with the space expander, a multi-piece oil ring used in an internal combustion engine. The side rail includes an outer peripheral surface facing radially outward, an inner peripheral surface facing radially inward, a first axial side surface facing one side in an axial direction, and a second axial side surface facing the other side in the axial direction and being in parallel with the first axial side surface, wherein a beveled portion is provided between the outer peripheral surface and the second axial side surface, the beveled portion is formed in a tapered surface having a diameter gradually decreasing from a position on the outer peripheral surface toward the second axial side surface, the position being 0.05 mm or more away from the first axial side surface toward the second axial side surface in the axial direction, and the tapered surface has a first tapered surface portion with an angle of 10° or more to the axial direction and a second tapered surface portion provided between the first tapered surface portion and the outer peripheral surface and having an angle of inclination smaller than that of the first tapered surface portion with respect to the axial direction.

In the above described configuration, the "split ring shape with an opening" refers to an oil ring with a portion thereof cut out in the circumferential direction and formed in a C-shape having an opening, which is the cut-off portion. Further, the "axial direction" refers to a direction along an axis of the side rail in a split ring shape.

In the above described configuration, a difference between an angle of the first tapered surface portion to the axial direction and an angle of the second tapered surface portion to the axial direction is preferably 2° or more.

In the above described configuration, an angle of the second tapered surface portion to the axial direction is preferably 2° or more and 12° or less.

In the above described configuration, a distance along the axial direction from an axial center position between an end on a side where the first axial side surface of the first tapered surface portion is located and an end on a side where the second axial side surface of the second tapered surface portion is located to the first axial side surface is preferably 60% or more and 80% or less of an axial thickness of the side rail.

In the above described configuration, the first tapered surface portion and the second tapered surface portion are preferably connected to each other smoothly by a tapered surface subportion in a curved shape.

In the above described configuration, when a combined area of the outer peripheral surface and the second tapered surface portion is assumed to be an outer peripheral surface area, an area of the tapered surface subportion and an area of an outer peripheral lower end surface in a curved shape provided between the outer peripheral surface and the first axial side surface, these areas being provided so as to sandwich the outer peripheral surface area in the axial direction, are preferably asymmetrical to each other with respect to a virtual plane passing through the axial center position between the first axial side surface and the second axial side surface.

In the above described configuration, the first tapered surface portion is preferably formed in a curved shape.

In the above described configuration, the outer peripheral surface and the beveled portion are preferably provided with a hard film on the surface thereof.

Advantageous Effect

According to this disclosure, a visible beveled portion is provided between the outer peripheral surface and the second axial side surface. Thus, even if the side rail has a top and bottom (front and back) directionality, top and bottom of the side rail can be easily distinguished by viewing the beveled portion during production thereof or assembly of a piston in a ring groove.

As described above, according to this disclosure, a side rail that facilitates distinction of top and bottom direction can be provided.

DETAILED DESCRIPTION

This disclosure will be illustrated in more detail below with reference to drawings.

Figure 1:
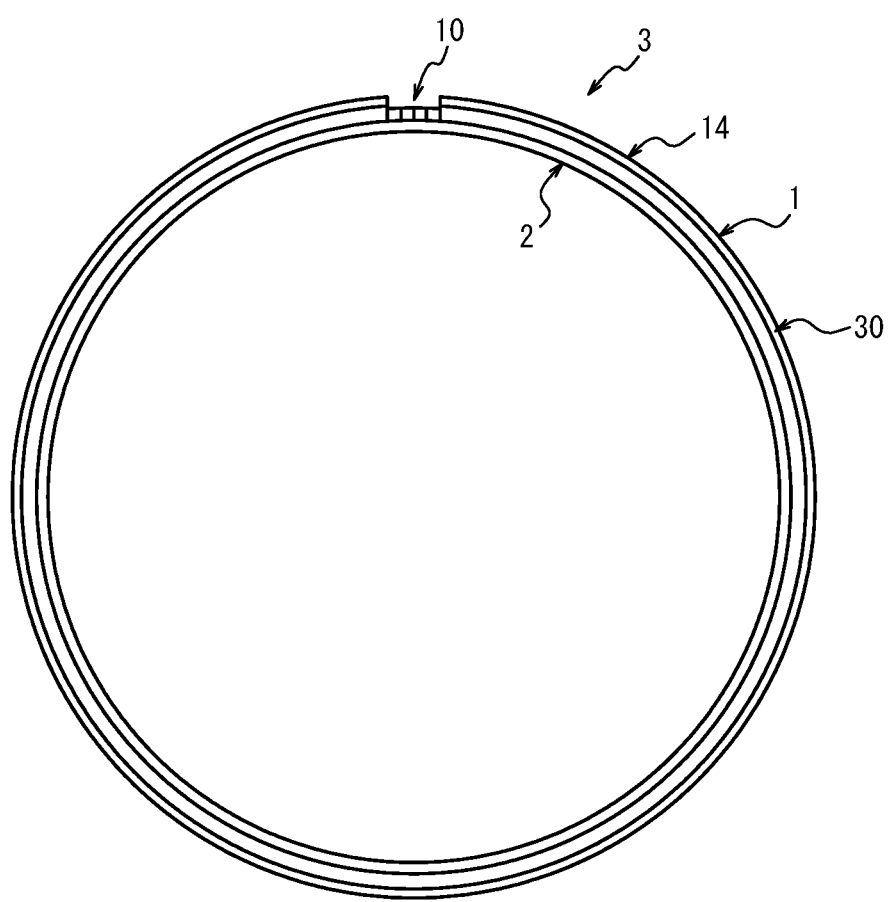
FIG. 1 is a plan view of a multi-piece oil ring including a side rail according to an embodiment of this disclosure.
Figure 2:
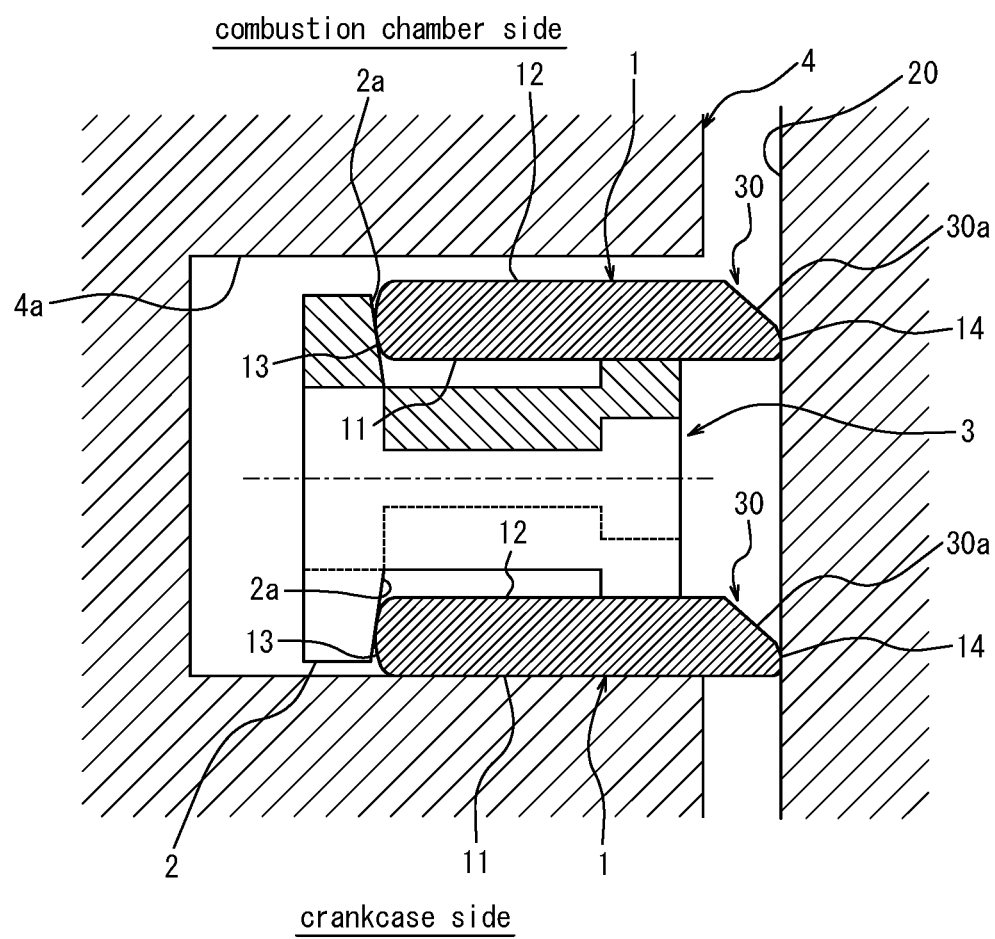
FIG. 2 is a longitudinal cross-sectional view of the multi-piece oil ring illustrated in FIG. 1 in use.

As illustrated in FIG. 1, a side rail 1 according to an embodiment of this disclosure forms a multi-piece oil ring (an oil control ring) 3 along with a space expander 2. As illustrated, the multi-piece oil ring 3 is a 3-piece type including a pair of side rails 1 provided on both sides of the space expander 2 in the axial direction. When used, the multi-piece oil ring 3 is mounted in a ring groove 4a formed in an outer peripheral surface of a piston 4 of a reciprocating internal combustion engine such as a gasoline engine, as illustrated in FIG. 2.

The multi-piece oil ring 3 may be a two-piece type, which is a combination of only one side rail 1 and the space expander 2.

The space expander 2 is made of steel and formed in an annular shape that can be elastically deformed radially inward and outward. The space expander 2 is mounted in the ring groove 4a of the piston 4 with elastically deformed in a diameter reducing direction, and presses the side rail 1 so as to expand the diameter of the side rail 1 radially outward and axially outward.

Figure 3:
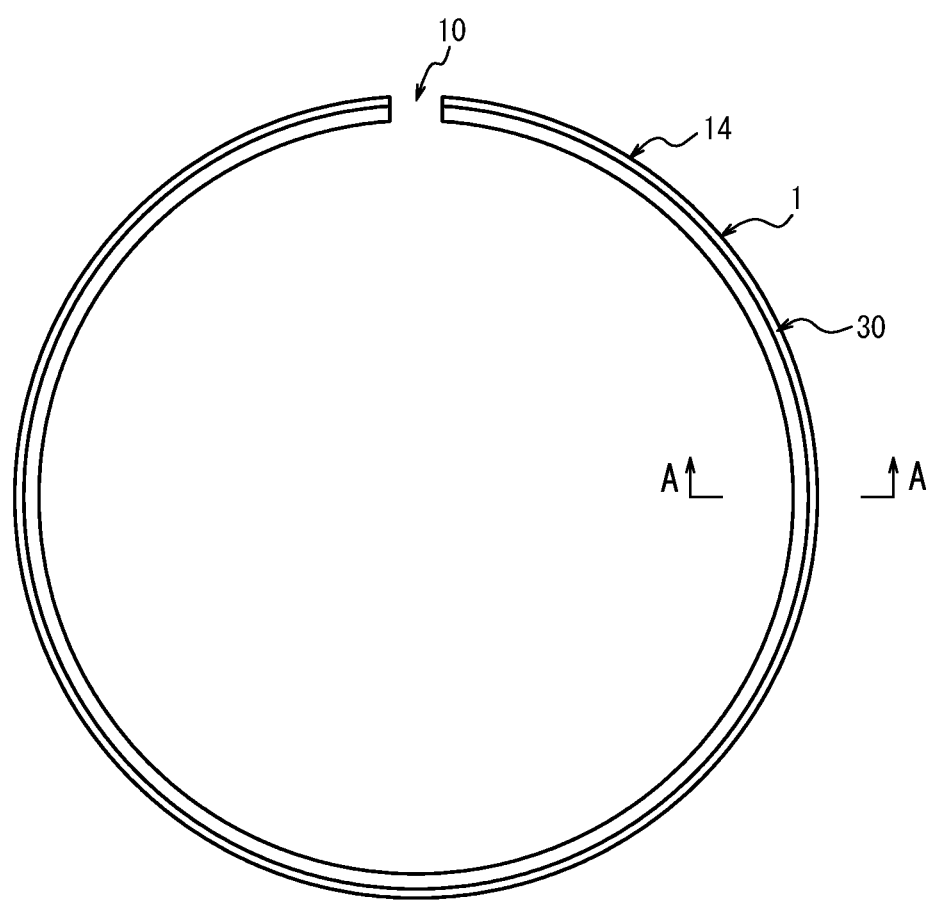
FIG. 3 is a plan view of the side rail illustrated in FIG. 1.

A pair of side rails 1 according to an embodiment of this disclosure have each the same configurations and, as illustrated in FIG. 3, are each made with a planar steel belt (steel material) that is bent to form a split ring shape with an opening 10. That is, the side rail 1 has a C-shape with the opening 10 formed as a cutout on a circumference of the side rail 1. The side rail 1 can be elastically deformed through expansion of the opening 10 in a circumferential direction, thus a diameter of the side rail 1 can be expanded radially outward.

Figure 4:
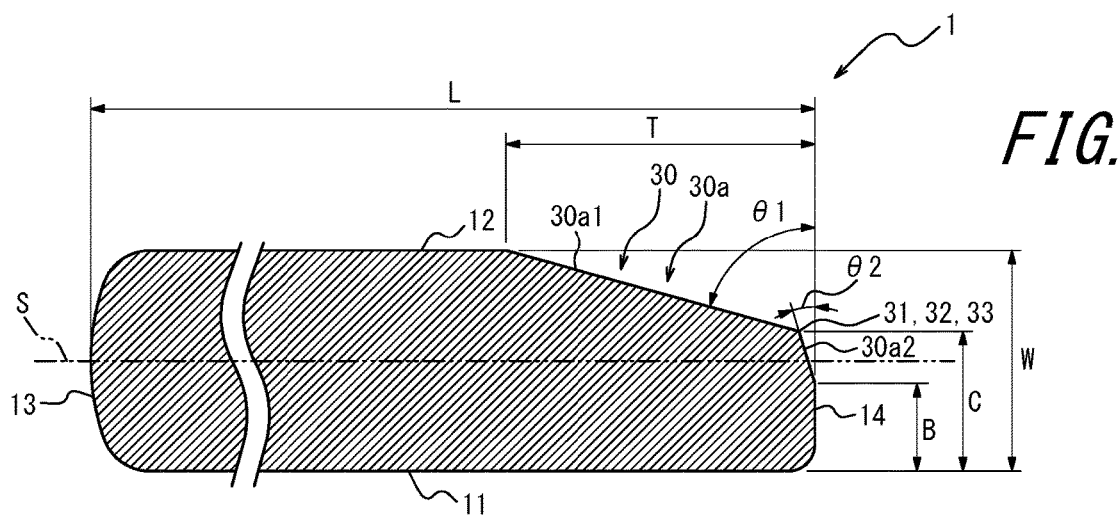
FIG. 4 is a cross-sectional view along A-A line in FIG. 3.

As illustrated in FIG. 4, the side rail 1 includes a first axial side surface 11 facing one side in an axial direction (a downward direction in the figure), a second axial side surface 12 facing the other side in the axial direction (an upward direction in the figure), an inner peripheral surface 13 facing radially inward, and an outer peripheral surface 14 facing radially outward. A cross-sectional shape of the side rail 1 perpendicular to its circumferential direction is approximately the same all over the circumference. Note that the "axial direction" refers to a direction along an axis center of the side rail 1 formed in a split ring shape.

The first axial side surface 11 is formed in a flat surface perpendicular to the axial direction. As illustrated in FIG. 2, the first axial side surface 11 faces a crankcase of an engine in a state where the multi-piece oil ring 3 including the side rail 1 is mounted on the piston 4.

As illustrated in FIG. 4, the second axial side surface 12 is formed in a flat surface perpendicular to the axial direction, i.e., parallel to the first axial side surface 11. As illustrated in FIG. 2, the second axial side surface 12 faces a combustion chamber of the engine in a state where the multi-piece oil ring 3 including the side rail 1 is mounted on the piston 4.

In the figure, an axial distance between the first axial side surface 11 and the second axial side surface 12 of the side rail 1, i.e., an axial thickness (a rail width) W of the side rail 1 is 0.35 mm, and a distance between the inner peripheral surface 13 and the outer peripheral surface 14, i.e., a radial length L of the side rail 1 is 1.52 mm.

As illustrated in FIG. 4, the inner peripheral surface 13 of the side rail 1 is formed in a curved surface (a barrel face) having a vertex at an axial center position. As illustrated in FIG. 2, the inner peripheral surface 13 of the side rail 1 comes in contact with a mounting plane 2a of the space expander 2 in a state where the multi-piece oil ring 3 including the side rail 1 is mounted on the piston 4.

Note that the inner peripheral surface 13 is not limited to the above described shape, and may have various shapes including a cylindrical surface parallel to the axial direction, for example.

As illustrated in FIG. 4, the outer peripheral surface 14 of the side rail 1 is formed in a cylindrical surface parallel to the axial direction. As illustrated in FIG. 2, the outer peripheral surface 14 of the side rail 1 comes in contact with a cylinder inner surface 20.

One of both ends in the axial direction of the outer peripheral surface 14 of the side rail 1 is provided with a beveled portion 30. That is, the beveled portion 30 is provided between the outer peripheral surface 14 and the second axial side surface 12. A portion between the outer peripheral surface 14 and the first axial side surface 11 does not need to be beveled but may be formed in a curved surface such as an R shape. In this case, the R-shape has a radial width and an axial width that are smaller than those of the beveled portion 30.

The beveled portion 30 includes a tapered surface 30a extending from a starting point toward the second axial side surface 12 while a diameter thereof gradually decreases. The starting point is a position located on the outer peripheral surface 14 where a first axial distance B from the first axial side surface 11 toward the second axial side surface is 0.05 mm or more, i.e., a position on the outer peripheral surface 14 that is away from the first axial side surface 11 by 0.05 mm or more toward the second axial side surface 12 in the axial direction.

Note that the first axial distance B, which is the starting point of the beveled portion 30, is more preferably 0.10 mm or more.

As illustrated in FIG. 4, the tapered surface 30a forming the beveled portion 30 includes a first tapered surface portion 30a1 inclined at an angle θ1 with respect to the axial direction and a second tapered surface subportion 30a2 provided between the first tapered surface portion 30a1 and the outer peripheral surface 14 and inclined at an angle θ2, which is smaller than the angle θ1, with respect to the axial direction. Note that the first tapered surface portion 30a1 is continuous to the second axial side surface 12 at an end on the side where the second axial side surface 12 is located. Further, the second tapered surface portion 30a2 is continuous to the outer peripheral surface 14 at an end on the side where the first axial side surface 11 is located.

The angle θ1 of the first tapered surface portion 30a1 to the axial direction is 10° or more. The angle θ1 of 10° or more allows the beveled portion 30 to be easily distinguished from the portions other than the beveled portion 30, and the visibility of the beveled portion 30 can be ensured. In view of ensuring visibility, the angle θ1 is preferably 30° or more. Further, the difference between the angle θ1 of the first tapered surface portion 30a1 to the axial direction and the angle θ2 of the second tapered surface portion 30a2 to the axial direction is preferably 2° or more. The difference between the angle θ1 and the angle θ2 of 2° or more allows the difference between the reflection angle of the light reflected from the first tapered surface portion 30a1 and the reflection angle of the light reflected from the second tapered surface portion 30a2 to be large, and the visibility of the beveled portion 30 can be enhanced.

In the state where the side rail 1 is mounted in the ring groove 4a of the piston 4 illustrated in FIG. 2, the beveled portion 30 may collide against the cylinder inner surface 20 when the side rail 1 tilts during vertical movement of the piston 4. Also in view of relief of this collision, the angle θ2 of the second tapered surface portion 30a2 to the axial direction is preferably smaller than the angle θ1 of the first tapered surface portion 30a1 to the axial direction by 2° or more. In view of relief of the collision, the angle θ2 of the second tapered surface portion 30a2 to the axial direction is preferably 2° or more and 10° or less. Moreover, in order to prevent the first tapered surface portion 30a1 from colliding against the cylinder inner surface 20, the axial distance of the second tapered surface portion 30a2 is preferably 0.10 mm or more, and more preferably 0.15 mm or more.

Note that, as illustrated, both of the first tapered surface portion 30a1 and the second tapered surface portion 30a2 are formed in a shape having a linearly reducing diameter (a conical surface shape), that is, in a linear tapered surface.

Further, a radial length T of the beveled portion 30, that is, the tapered surface 30a, is preferably 0.05 mm or more.

In this manner, according to the side rail 1 of this disclosure, one of both axial ends of the outer peripheral surface 14 includes the beveled portion 30 having visibility. Thus, the beveled portion 30 enables, when the side rail 1 has top and bottom (front and back) directionality, workers to easily distinguish the top and bottom of the side rail 1 by viewing the beveled portion 30 with his/her eyes or by using an optical noncontact distinction device during production of the side rail 1 or during assembly of the side rail 1 in the ring groove of the piston. Accordingly, during the work, the side rail 1 can be prevented from being mounted facing a wrong direction.

Further, when the tapered surface 30a forming the beveled portion 30 includes the first tapered surface portion 30a1 and the second tapered surface portion 30a2 that inclines, in the axial direction, with an angle θ2 that is smaller than that of the first tapered surface portion 30a1, a radial length T of the beveled portion 30 is ensured to enhance its visibility and at the same time, an incident angle to the outer peripheral surface 14 can be reduced by the second tapered surface portion 30a2. In this manner, the beveled portion 30 prevents the edge of the outer peripheral surface 14 from scraping-up the oil to the cylinder inner surface 20, and thus oil consumption can be reduced. Note that, in view of reduction in oil consumption, the angle θ2 of the second tapered surface portion 30a2 to the axial direction is preferably 2° or more and 12° or less, and more preferably 4° or more and 8° or less.

Note that, as illustrated in FIG. 4, a second axial distance C along the axial direction from an axial center position 33 between an end 31 on the side where the first axial side surface 11 of the first tapered surface portion 30a1 is located and an end 32 on the side where the second axial side surface 12 of the second tapered surface portion 30a2 is located to the first axial side surface 11 is preferably 60% or more and 80% or less of the axial thickness W of the side rail 1. When the second axial distance C is 80% or less of the axial thickness W of the side rail 1, the radial length T of the beveled portion 30 can be secured to a certain length or more, and thus the visibility of the beveled portion 30 can be enhanced. Further, when the second axial distance C is 60% or more of the axial thickness W of the side rail 1, an area of the second tapered surface portion 30a2 can be secured to a certain size or more, and thus oil consumption can be reduced. Note that, in the example illustrated in FIG. 4, the first tapered surface portion 30a1 is continuous to the second tapered surface portion 30a2, and thus the axial center position 33 is the same position as the end 31 and the end 32.

Figure 5:
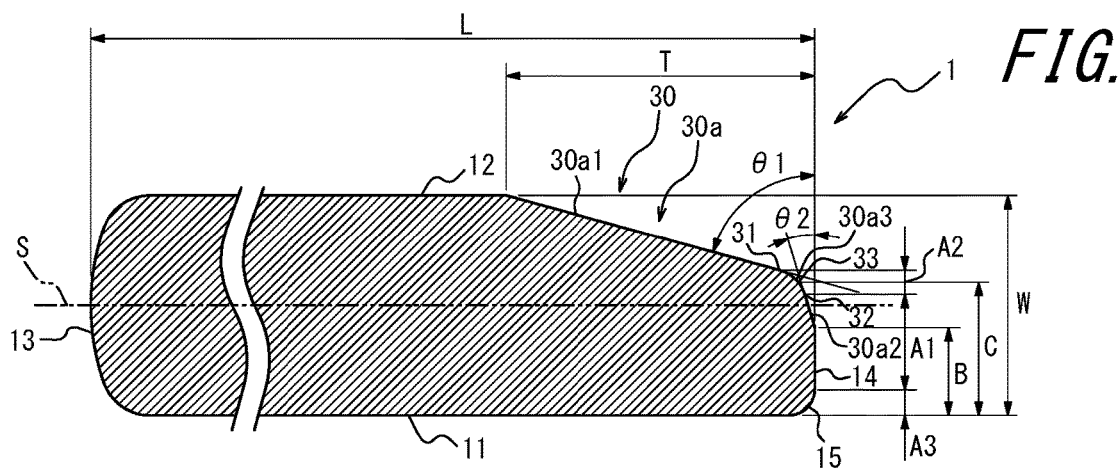
FIG. 5 is a variation of the side rail illustrated in FIG. 4, in which a tapered surface subportion is provided between the first tapered surface portion and the second tapered surface portion.

As illustrated in FIG. 5, the tapered surface 30a forming the beveled portion 30 may be provided with a tapered surface subportion 30a3 in a curved shape between the first tapered surface portion 30a1 and the second tapered surface portion 30a2 so as to smoothly connect the first tapered surface portion 30a1 and the second tapered surface portion 30a2 thereby. In this case, although the tapered surface subportion 30a3 is preferably formed in a curved shape with a certain radius of curvature, it may be formed in a curved shape with a gradually changing radius of curvature. Note that, in the example illustrated in FIG. 5, as with the example illustrated in FIG. 4, both of the first tapered surface portion 30a1 and the second tapered surface portion 30a2 are formed in a shape having a linearly reducing diameter (a conical surface shape), that is, in a linear tapered surface.

In this manner, when the tapered surface 30a forming the beveled portion 30 is formed such that it is provided with the tapered surface subportion in a curved shape between the first tapered surface portion 30a1 and the second tapered surface portion 30a2, scraping-up of oil by the edge of the outer peripheral surface 14 is prevented in more effective manner and oil consumption can be further reduced.

Note that, also in the example illustrated in FIG. 5, as with the example illustrated in FIG. 4, the angle θ1 of the first tapered surface portion 30a1 to the axial direction is 10° or more, and preferably 30° or more. Further, the difference between the angle θ1 of the first tapered surface portion 30a1 to the axial direction and the angle θ2 of the second tapered surface portion 30a2 to the axial direction is preferably 2° or more. Further, the angle θ2 of the second tapered surface portion 30a2 to the axial direction is preferably 2° or more and 12° or less. Moreover, a second axial distance C along the axial direction from the axial center position 33 between the end 31 on the side where the first axial side surface 11 of the first tapered surface portion 30a1 is located and the end 32 on the side where the second axial side surface 12 of the second tapered surface portion 30a2 is located to the first axial side surface 11 is preferably 60% or more and 80% or less of the axial thickness W of the side rail 1. Note that, in the example illustrated in FIG. 5, the axial center position 33 is located at the axial center of the tapered surface subportion 30a3.

Figure 6:
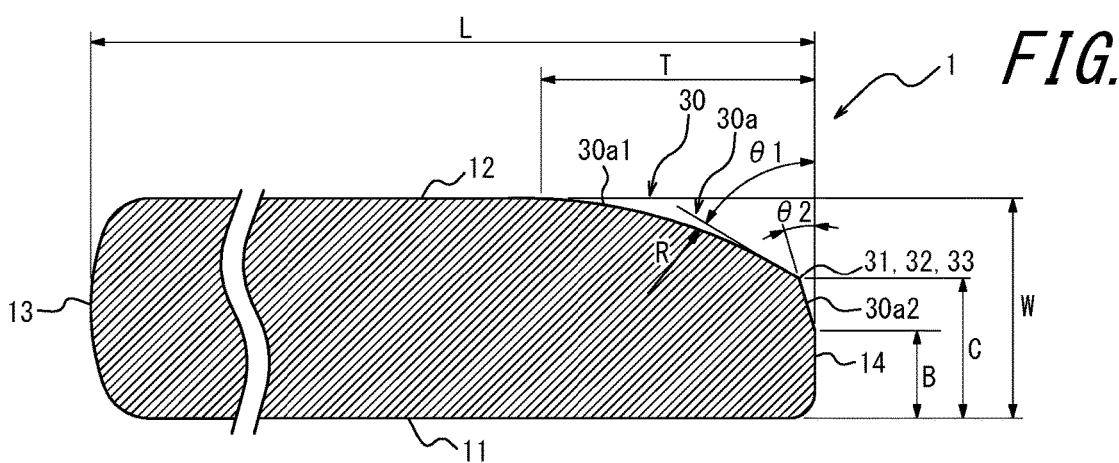
FIG. 6 is a variation of the side rail illustrated in FIG. 4, in which the first tapered surface portion is formed in a curved shape.

Further, as illustrated in FIG. 6, the first tapered surface portion 30a1 of the beveled portion 30 may be formed also in a curved shape. Further, in this case, although the first tapered surface portion 30a1 is preferably formed in a curved shape with a certain radius of curvature, it may be formed in a curved shape with a gradually changing radius of curvature. Note that, in the example illustrated in FIG. 6, the second tapered surface portion 30a2 is formed in a shape having a linearly reducing diameter (a conical surface shape), that is, in a linear tapered surface.

In this manner, the beveled portion 30 provided with the first tapered surface portion 30a1 in a curved shape enables the beveled portion 30 to be more visible, which further facilitates top and bottom distinction of the side rail 1.

Note that, also in the example illustrated in FIG. 6, as with the examples illustrated in FIGS. 4 and 5, the angle θ1 of the first tapered surface portion 30a1 to the axial direction is 10° or more, and preferably 30° or more. Further, the difference between the angle θ1 of the first tapered surface portion 30a1 to the axial direction and the angle θ2 of the second tapered surface portion 30a2 to the axial direction is preferably 2° or more. The angle θ2 of the second tapered surface portion 30a2 to the axial direction is preferably 2° or more and 12° or less. Moreover, a second axial distance C along the axial direction from the axial center position 33 between the end 31 on the side where the first axial side surface 11 of the first tapered surface portion 30a1 is located and the end 32 on the side where the second axial side surface 12 of the second tapered surface portion 30a2 is located to the first axial side surface 11 is preferably 60% or more and 80% or less of the axial thickness W of the side rail 1.

In this case, as illustrated in FIG. 6, the angle θ1 of the first tapered surface portion 30a1 in a curved shape to the axial direction is an angle of a tangent of the first tapered surface portion 30a1 at the end 31 on the side where the first axial side surface 11 of the first tapered surface portion 30a1 is located to the axial direction.

Note that, in the case of the example illustrated in FIG. 6, although the tapered surface subportion 30a3 is not provided between the first tapered surface portion 30a1 and the second tapered surface portion 30a2, it may be provided therebetween.

As illustrated in FIG. 5, provided a combined area of the second tapered surface portion 30a2 of the beveled portion 30 facing radially outward and the outer peripheral surface 14 is an outer peripheral surface area A1, in order to facilitate top and bottom distinction of the side rail 1, two areas axially sandwiching the outer peripheral surface area A1, that is, the area A2 of the tapered surface subportion 30a3 and the area A3 of the outer peripheral lower end surface 15 in a curved shape provided between the outer peripheral surface 14 and the first axial side surface 11 are preferably asymmetrical to each other with respect to a virtual plane S passing through the axial center position between the first axial side surface 11 and the second axial side surface 12.

In this case, the outer peripheral surface area A1 of the side rail 1 is preferably formed asymmetric with respect to the axial direction. Although not illustrated in detail, the asymmetric shape may be formed as follows. That is, when a line passing through the axial center thereof and orthogonal to the axial direction is assumed to be a first intermediate line; and at an outer peripheral tip end portion where a contour curve of the outer peripheral surface in the longitudinal cross section is traced, out of two positions on the contour curve corresponding to a position at a distance of 3 μm from the outer peripheral vertex toward the radial inner peripheral side, a position on the engine combustion chamber side is assumed to be a position a1 and a position on the side away from the engine combustion chamber is assumed to be a position b1, a length of a line segment between the position a1 and the position b1 is assumed to be L1, and an intermediate line of the line segment of the length L1 is assumed to be a second intermediate line; the second intermediate line is located on the side further away from the engine combustion chamber than the first intermediate line. Further, the outer periphery vertex of the side rail 1 is located on the second intermediate line or on the side further away from the engine combustion chamber than the second intermediate line. The contour curve of the outer peripheral surface in the longitudinal cross section is traced from the outer peripheral vertex of the side rail 1 toward radially inner peripheral side by at least 0.025 mm such that a pair of symmetrical shapes exist on the radially inner peripheral side position (both end sides in the axial direction being regarded as a pair). When the contour curve in an asymmetrical shape at the outer peripheral tip end portion of the side rail 1 is sectioned into a curved portion sandwiched between the outer peripheral vertex and a distance of 1.5 μm from the outer peripheral vertex toward the radial inner peripheral side and a contour portion sandwiched between a distance of 1.5 μm and a distance of 3.0 μm from the outer peripheral vertex toward the radial inner peripheral side, and a first contour section, a second contour section and a third contour section are set from the engine combustion chamber side of the cylinder, the first contour section is provided to be a part of a linear shape or a part of a quadratic curve shape starting from a first end portion on the engine combustion chamber side of the second contour section. The second contour section includes the outer peripheral vertex at an intermediate portion thereof and is provided in an arc shape, and the third contour section is provided to be a part of a quadratic curve shape starting from a second end portion on the side away from the engine combustion chamber of the second contour section. A surface roughness of the asymmetrical portion of the outer peripheral surface of the side rail 1 is 0.6 μm Rp or less. When a length on the position a1 side and a length on the position b1 side of the line segment L1 divided by a radial line orthogonal to a line segment between the position a1 and the position b1 of the outer peripheral tip end portion of the contour curve and passing through the outer peripheral vertex are assumed to be L2 and L3, respectively, further, at two positions on the contour curve at a distance of 1.5 μm toward the radially inner peripheral side, a position on the engine combustion chamber side is assumed to be a position a2 and a position on the side away from the engine combustion chamber is assumed to be a position b2, and then a length of a line segment between the position a2 and the position b2 is assumed to be L4, conditions of 0.05 mm≤L1≤0.15 mm, L2/L1≥0.5 and L3/L1≤0.74 are satisfied. When an angle formed between a first line passing through the position a1 and the position a2 and the axial direction of the cylinder is assumed to be an angle θ3, a condition of 2 degrees≤θ3≤7 degrees is satisfied. When an angle formed between a second line passing through the position b1 and the position b2 and the axial direction of the cylinder is assumed to be an angle θ4, a condition of 9 degrees≤θ4 is satisfied.

An asymmetric shape of the outer peripheral surface area A1 of the side rail 1 may also be formed as follows. That is, when a line passing through the center of its segment width is assumed to be a first intermediate line; and at an outer peripheral tip end portion where a contour curve of the outer peripheral surface in the longitudinal cross section is traced, out of two positions on the contour curve corresponding to a position at a distance of 3 μm from the outer peripheral vertex toward the radial inner peripheral side, a position on the engine combustion chamber side is assumed to be a position a1, a position on the side away from the engine combustion chamber is assumed to be a position b1, a length of a line segment between the position a1 and the position b1 is assumed to be L1, and an intermediate line of the line segment of the length L1 is assumed to be a second intermediate line; the second intermediate line is located on the side further away from the engine combustion chamber than the first intermediate line. Further, the outer periphery vertex of the side rail 1 is located on the second intermediate line or on the side further away from the engine combustion chamber than the second intermediate line. The contour curve of the outer peripheral surface in the longitudinal cross section is traced from the outer peripheral vertex of the side rail 1 to at least 0.025 mm toward radially inner peripheral side such that a pair of symmetrical shapes exists on the radially inner peripheral side position (both end sides in the axial direction being regarded as a pair). When the contour curve in an asymmetrical shape at the outer peripheral tip end portion of the side rail 1 is sectioned into a curved portion sandwiched between the outer peripheral vertex and a distance of 1.5 μm from the outer peripheral vertex toward the radial inner peripheral side and a contour portion sandwiched between a distance of 1.5 μm and a distance of 3.0 μm from the outer peripheral vertex toward the inner peripheral side in a segment radial direction, and a first contour section, a second contour section and a third contour section are set from the engine combustion chamber side of the cylinder, the first contour section is provided to be a part of a linear shape or a part of a quadratic curve shape starting from a first end portion on the engine combustion chamber side of the second contour section. The second contour section includes a flat portion at an intermediate portion thereof, and is provided to be a part of a linear shape or a part of a quadratic curve shape from an end portion on the engine combustion chamber side of the flat portion in the axial direction then is continuous to the first contour section, further, is provided to be a part of a quadratic curve shape from an end portion on the side away from the engine combustion chamber of the flat portion in the axial direction then is continuous to the third contour section. Further, the third contour section is provided to be a part of a quadratic curve shape continuous to the second end portion. A surface roughness of the asymmetrical portion of the outer peripheral surface of the side rail 1 is 0.6 μm Rp or less. When a length on the position a1 side and a length on the position b1 side of the line segment L1 divided by a radial line orthogonal to a line segment between the position a1 and the position b1 of the outer peripheral tip end portion of the contour curve of the outer peripheral surface of the side rail 1 and passing through the outer peripheral vertex are assumed to be L2 and L3, respectively, further, at two positions on the contour curve at a distance of 1.5 μm toward the radially inner peripheral side, a position on the engine combustion chamber side is assumed to be a position a2 and a position on the side away from the engine combustion chamber is assumed to be a position b2, and then a length of a line segment between the position a2 and the position b2 is assumed to be L4, then an axial length of the flat portion of the second contour section is assumed to be L5, the conditions of 0.05 mm≤L1≤0.15 mm, L2/L1≥0.5, L4/L1≤0.76 and 0<L5≤0.05 mm are satisfied. When an angle formed between the first line passing through the position a1 and the position a2 and the axial direction of the cylinder is assumed to be an angle θ3, a condition of 3 degrees≤θ3≤6 degrees is satisfied. When an angle formed between the second line passing through the position b1 and the position b2 and the axial direction of the cylinder is assumed to be an angle θ4, a condition of 9 degrees≤θ4 is satisfied.

When the outer peripheral surface area A1 is formed in the above described shape and the area A2 of the tapered surface subportion 30a3 and the area A3 of the outer peripheral outer peripheral lower end surface 15 are formed in asymmetrical to each other with respect to a virtual plane S passing through the axial intermediate position between the first axial side surface 11 and the second axial side surface 12, oil consumption can be reduced and top and bottom direction of the side rail 1 can be distinguished more easily.

Although not illustrated in detail, a hard film (a hard layer) may be provided at least on the outer peripheral surface 14 and the beveled portion 30, that is, the tapered surface 30a. The hard film may contain at least one of a layer treated with nitriding, a PVD-processed layer, a hard-chromium plated layer and a DLC layer.

Note that the "PVD treated layer" refers to "a layer formed by Physical Vapor Deposition," and the "DLC (Diamond Like Carbon) layer" refers to a noncrystalline hard carbon film mainly composed of hydrocarbon or carbon allotrope The hard film provided on the tapered surface 30a as described above offers effects such as preventing the outer peripheral surface 14 from being deformed due to abrasion, maintaining the outer peripheral shape thereof, less decrease in a surface pressure, maintaining oil controlling functionality, and reducing the oil consumption and fuel consumption of the engine for a long period of time. Further, the hard film may provide the beveled portion 30, which is to be viewed by workers, with a hue that is clearly different from a hue of the second axial side surface 12 and the outer peripheral surface 14. In particular, when the outer peripheral surface 14 is subjected to lapping, a difference between the hue of the outer peripheral surface 14 and a hue of the remaining portion becomes more apparent. Therefore, such a hard film as described above may allow the beveled portion 30 to be more easily viewed, further facilitating the top and bottom distinction of the side rail 1.

EXAMPLES

Example 1

One hundred side rails in the shape as illustrated in FIG. 4 were prepared. These side rails each had the axial thickness (W) of 0.35 mm, the first axial distance (B) indicating a beveled position of the beveled portion of 0.15 mm, the angle ($\theta 1$) of the first tapered surface portion of the beveled portion to the axial direction of 30°, and the angle ($\theta 2$) of the second tapered surface portion to the axial direction of 6°. Then, top and the bottom distinction was implemented by 10 workers. The workers distinguished the side rail direction with their eyes. As a result, the top and the bottom of all of the side rails were correctly distinguished by the workers.

Example 2

A plurality of side rails in the shape as illustrated in FIG. 4 were prepared. These side rails each had an axial thickness (W) of 0.35 mm, a radial length (L) of 1.62 mm, a first axial distance (B) indicating the beveled position of the beveled portion of 0.15 mm, a second axial distance (C) of 67% of the axial thickness (W), that is, 0.23 mm, and an angle ($\theta 1$) of the first tapered surface portion of the beveled portion to the axial direction of 15°. The angles ($\theta 2$) of the second tapered surface portions of these side rails to the axial direction were different from each other.

Distinction of top and bottom directions of these side rails was made by 10 workers. As a result, the workers could correctly distinguish the directions of all of 100 pieces of side rails when the difference between the angle ($\theta 1$) of the first tapered surface portion 30$a$1 to the axial direction and the angle ($\theta 2$) of the second tapered surface portion 30$a$2 to the axial direction was 2° or more, and could not correctly distinguish the directions of three of them when the difference was less than 2°. That is, the workers could more correctly distinguish the top and bottom directions of the side rails when the angle ($\theta 2$) of the second tapered surface portion 30$a$2 of the side rail to the axial direction was smaller than the angle ($\theta 1$) of the first tapered surface portion 30$a$1 to the axial direction by 2° or more.

Example 3

Figure 7:
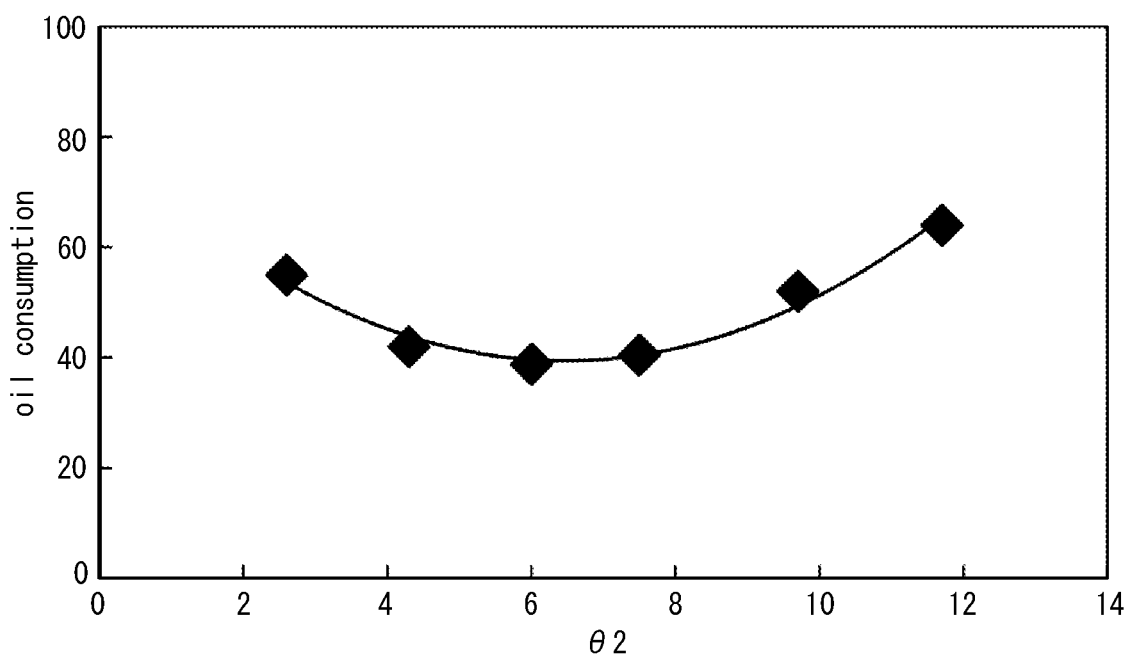
FIG. 7 is a graph illustrating a relationship between an angle of a second tapered surface portion to an axial direction and oil consumption in Example 3.

A plurality of multi-piece oil rings were produced with the side rails used in Example 2. A plurality of pistons were prepared, each of them having a ring groove in which the produced multi-piece oil ring was mounted, and these pistons were reciprocated in a cylinder for a predetermined number of times and oil consumption was measured. Specifically, oil consumption was measured by operating the pistons for a predetermined period of time by using a water-cooled 4-cycle gasoline engine with a supercharger (2 liter, 4 cylinder) under the conditions of 6000 rpm and full load (WOT: Wide Open Throttle). The top ring and the second ring used in each measurement were the same as those used in the comparative example described later. FIG. 7 is a graph illustrating a relationship between the angle ($\theta 2$) of the second tapered surface portion 30$a$2 to the axial direction and the oil consumption in this example. In this case, as a comparative example, the oil consumption was measured by using a side rail having an outer peripheral surface formed in a curved shape (barrel-faced) with a vertex at the axial center position, and the oil consumption measured by using this side rail was regarded as 100. As illustrated in FIG. 7, it was found that oil consumption could be reduced when the angle ($\theta 2$) of the second tapered surface portion to the axial direction was 2° or more and 12° or less, and oil consumption could be further reduced when the angle ($\theta 2$) was 4° or more and 8° or less. Further, when the angle ($\theta 2$) of the second tapered surface portion to the axial direction was 2° or more and 12° or less, no scratches were found on the cylinder inner surface, which indicated possible reduction in collision of the beveled portion against the cylinder inner surface.

This disclosure is not limited to the above described embodiment, and may be modified in a variety of manners without departing from the spirit and the scope thereof.

For example, in the above described embodiment, although the outer peripheral surface 14 is formed in a cylindrical surface parallel to the axial direction, the outer peripheral surface 14 may be formed into a different shape including a vertically (in front and back sides) asymmetrical shape with a slight shape change.

REFERENCE SIGNS LIST

1 Side rail
2 Space expander
2$a$ Mounting plane
3 Multi-piece oil ring
4 Piston
4$a$ Ring groove
10 Opening
11 First axial side surface
12 Second axial side surface
13 Inner peripheral surface
14 Outer peripheral surface
15 Outer peripheral lower end surface
20 Cylinder inner surface
30 Beveled portion
30$a$ Tapered surface
30$a$1 First tapered surface portion
30$a$2 Second tapered surface portion
30$a$3 Tapered surface subportion
31 End on the side where the first axial side surface of the first tapered surface portion is located
32 End on the side where the second axial side surface of the second tapered surface portion is located
33 Axial center position
W Axial thickness
L Radial length
B First axial distance
C Second axial distance
$\theta$ Angle
T Radial length
$\theta 1$ Angle
$\theta 2$ Angle
A1 Outer peripheral surface area
A2 Tapered surface subportion area
A3 Outer peripheral lower end surface area
S Virtual plane

The invention claimed is:

1. A side rail formed in a split ring shape with an opening, and configured to be combined with an annular space expander to form, together with the space expander, a multi-piece oil ring used in an internal combustion engine, the side rail comprising:

an outer peripheral surface facing radially outward and formed in a cylindrical surface parallel to an axial direction;

an inner peripheral surface facing radially inward;

a first axial side surface facing one side in an axial direction; and a second axial side surface facing the other side in the axial direction and being in parallel with the first axial side surface, wherein a beveled portion is provided between the outer peripheral surface and the second axial side surface;

the beveled portion is formed in a tapered surface having a diameter gradually decreasing from a position on the outer peripheral surface toward the second axial side surface, the position being 0.05 mm or more away from the first axial side surface toward the second axial side surface in the axial direction;

the tapered surface consists of a first tapered surface portion with an angle of 10° or more to the axial direction and a second tapered surface portion provided between the first tapered surface portion and the outer peripheral surface and having an angle of inclination to the axial direction smaller than that of the first tapered surface portion, the second tapered surface portion being formed in a conical surface shape which has a linear contour in the sectional view, and the beveled portion has a radial length of 0.05 mm or more.

2. The side rail according to claim 1, wherein a difference between an angle of the first tapered surface portion to the axial direction and an angle of the second tapered surface portion to the axial direction is 2° or more.

3. The side rail according to claim 1, wherein an angle of the second tapered surface portion to the axial direction is 2° or more and 12° or less.

4. The side rail according to claim 1, wherein a distance along the axial direction from an axial center position between an end on a side where the first axial side surface of the first tapered surface portion is located and an end on a side where the second axial side surface of the second tapered surface portion is located to the first axial side surface is 60% or more and 80% or less of an axial thickness of the side rail.

5. The side rail according to claim 1, wherein the first tapered surface portion and the second tapered surface portion are smoothly connected to each other by a tapered surface subportion formed in a curved shape.

6. The side rail according to claim 5, wherein an area of the tapered surface subportion and an area of an outer peripheral lower end surface that is formed in a curved shape and provided between the outer peripheral surface and the first axial side surface are provided so as to sandwich a combined area of the outer peripheral surface and the second tapered surface portion in the axial direction and are asymmetrical to each other with respect to a virtual plane passing through the axial center position between the first axial side surface and the second axial side surface.

7. The side rail according to claim 1, wherein the first tapered surface portion is formed in a curved shape.

8. The side rail according to claim 1, wherein a hard film is provided on the outer peripheral surface and a surface of the beveled portion.

* * * * *